A. A. DORSEY.
DIVIDING BOARD FOR MOWING MACHINES.
APPLICATION FILED JAN. 4, 1916.
1,221,980.
Patented Apr. 10, 1917.
2 SHEETS—SHEET 1.
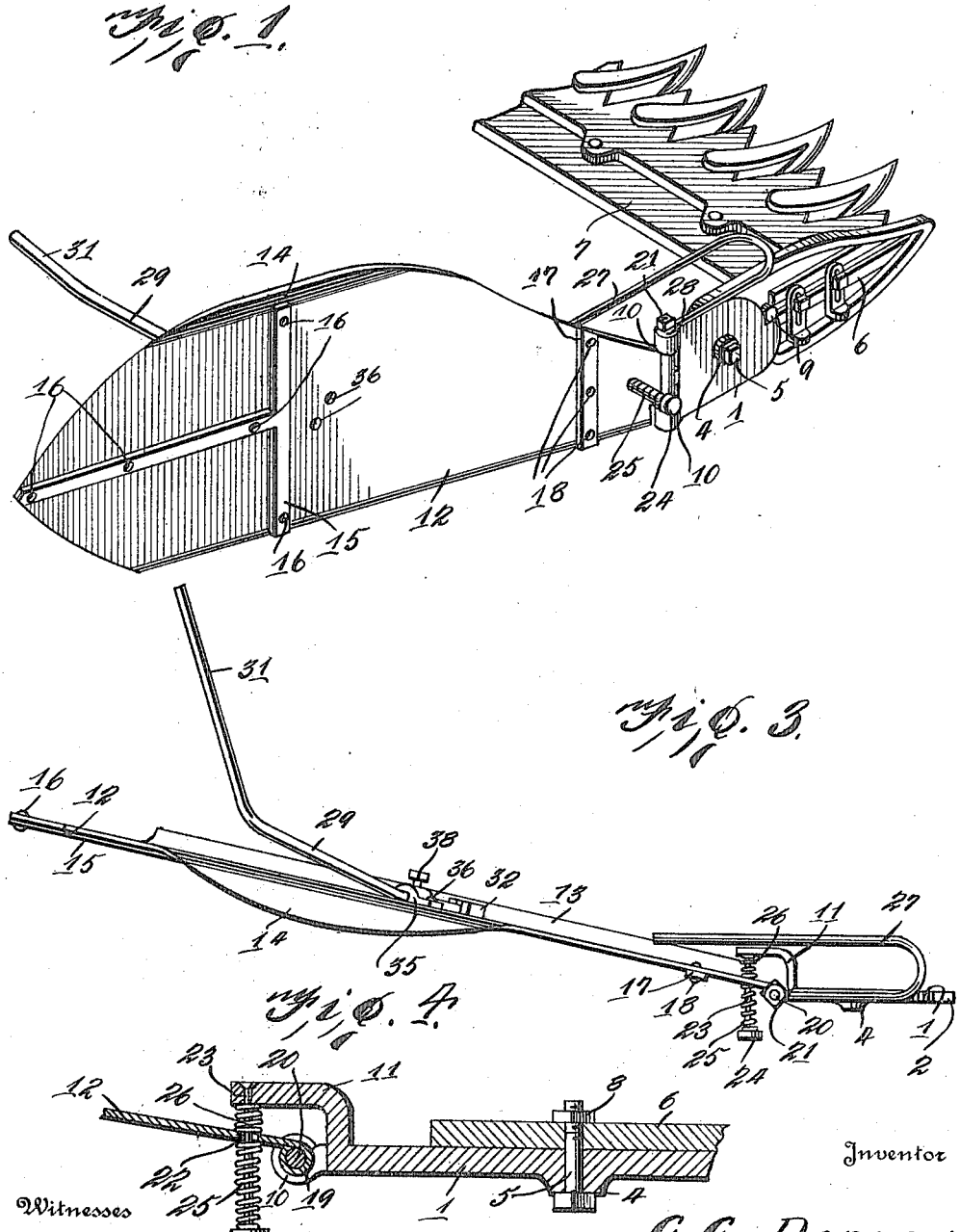

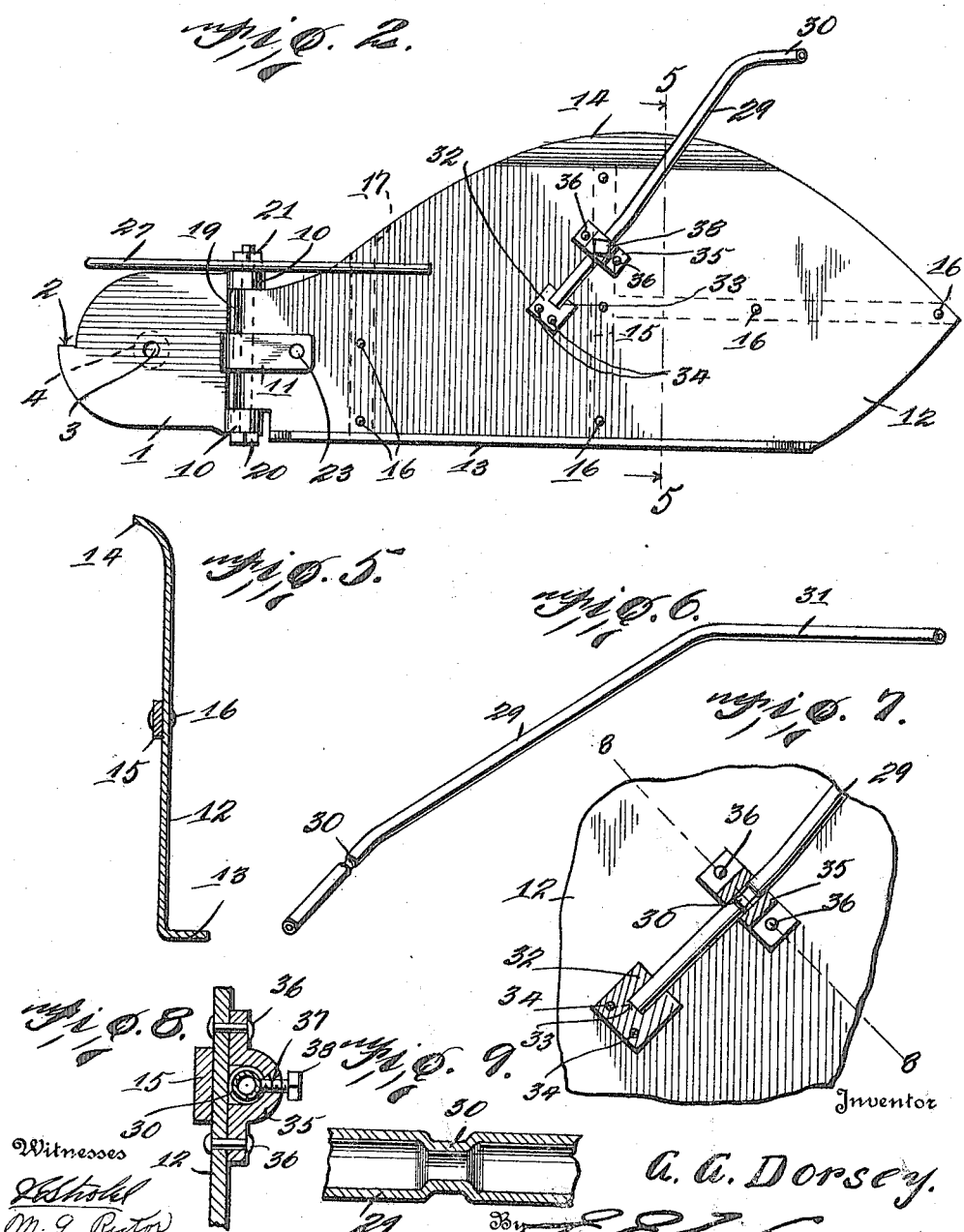

UNITED STATES PATENT OFFICE.

ADOLPHUS A. DORSEY, OF NEWPORT, NEBRASKA.

DIVIDING-BOARD FOR MOWING-MACHINES.

1,221,980.　　　　Specification of Letters Patent.　　Patented Apr. 10, 1917.

Application filed January 4, 1916. Serial No. 70,235.

*To all whom it may concern:*

Be it known that I, ADOLPHUS A. DORSEY, a citizen of the United States, residing at Newport, in the county of Rock and State of Nebraska, have invented certain new and useful Improvements in Dividing-Boards for Mowing-Machines, of which the following is a specification, reference being had therein to the accompanying drawing.

This invention relates to a dividing board for mowing machines, and has for its principal object the production of a simple and efficient means for positively throwing the grain which is cut adjacent the outer end of the finger bar and which is falling over on to the mowed portion of a field directly in the rear of the finger bar.

Another object of this invention is the production of a dividing board for mowing machines wherein the dividing board is pivotally mounted upon a certain casting, this casting being secured to the head of the finger bar whereby the dividing board may be swung in a horizontal plane while the casting may be moved in a vertical plane, thus allowing movement in two directions so that any strain which may be brought to bear upon the dividing board may be greatly reduced, and in this manner prevent injury to the dividing board.

Another object of this invention is the production of a dividing board for mowing machines which is pivotally mounted upon a casting, this dividing board being capable of horizontal movement and being further retained in one position by means of coiled springs whereby falling grain may be caught by the dividing board and thrown inwardly upon the mowed portion of a field, thereby preventing the falling grain from falling over into the standing grain, in which case upon the next trip of the mower the falling grain would become entangled in the finger bar and prevent the same from efficiently severing the standing grain.

A still further object of this invention is the production of a dividing board for mowing machines which is pivotally mounted upon a casting, this casting being pivotally mounted upon the head of the finger bar and being capable of vertical movement, so that the casting and dividing board may be allowed to move in any desired direction when undue strain is brought to bear upon the dividing board, there being further provided a guard extending above the casting and around to the inner portions of the dividing board so as to prevent the falling grain from becoming entangled in the connecting portions of the casting or the dividing board.

A still further object of this invention is the production of a sheet metal dividing board having reinforcing means whereby the dividing board may be operated efficiently for throwing falling grain over on to the mowed portions of a field, and which is constructed so as to minimize the possibility of the same becoming broken, thereby prolonging the life of the dividing board when in use.

With these and other objects in view this invention consists of certain novel combinations, constructions, and arrangements of parts as will be hereinafter fully described and claimed.

In the accompanying drawings:

Figure 1 is a detail perspective view of the dividing board for mowing machines as constructed in accordance with this invention, illustrating the manner in which the same is secured to the casting and showing the casting carried upon the head of the finger bar.

Fig. 2 is a detail side elevation of the dividing board for mowing machines, showing the same secured to the casting.

Fig. 3 is a top plan view of the dividing board and casting, illustrating the angle to which the dividing board extends for throwing falling grain over on to the mowed portions of a field, and further illustrating how the falling grain is prevented from falling upon the connected portions of the dividing board and casting.

Fig. 4 is an enlarged fragmentary sectional view through the dividing board, casting, and head of the finger bar, illustrating how these elements are connected together.

Fig. 5 is a section taken on the line 5—5 of Fig. 2, taken behind the guard arm, and illustrating the construction of the dividing board looking in the direction of the arrows.

Fig. 6 is a detail perspective view of the guard arm.

Fig. 7 is a fragmentary side elevation of the dividing board showing the supporting block and clamp carried thereby and illustrating how the guard arm is secured.

Fig. 8 is a section taken on the line 8—8 of Fig. 7.

Fig. 9 is an enlarged fragmentary sectional view through a portion of the guard arm, illustrating a compressed portion thereof constituting an annular groove.

Referring to the accompanying drawings by numerals it will be seen that the casting comprises a body 1 which is preferably flat and which is cut away at its forward portion to provide the shoulder 2. A central opening 3 is formed in the body 1 and the neck 4 formed integral upon the casting surrounds the opening 3 and thereby forms a comparatively broad bearing surface, as clearly shown in Fig. 4. The bolt 5 passes through the opening 3 formed in the body 1 and also through the head 6 of the finger bar 7. A nut 8 is mounted upon the extending end of the bolt 5 and in this manner the casting will be held in engagement with the head 6 of the finger bar 7, although the casting may be swung in a vertical plane when necessary. In order to limit the downward movement of the rear end of the casting, however, the shoulder 2 is adapted to abut against the lug 9 carried by the head 6, whereby the casting will be retained normally in a set position. The body 1 of the casting is further provided with the spaced rolled eyes 10 at its rear portion which perform functions to be hereinafter set forth, and extending from the casting is a substantially L-shaped bracket 11 which extends from the rear portion of the body 1, a plane intermediate between the eyes 10.

The dividing board 12 is formed from a blank sheet of metal and is provided with the flange 13 at its lower portions. This flange 13 is coparatively broad in cross-section, as shown in Fig. 5, and is adapted to constitute a runner for the dividing board 12, thereby preventing the dividing board from cutting into the ground when in operation. The upper portion of the dividing board 12 is curved over or bent as shown at 14, and therefore, it will be seen that by the construction of the bent over portion 14 and the flange 13 the dividing board although formed of sheet metal as hereinbefore set forth, will be prevented from buckling or bending in cross-section. A T-shaped reinforcing strip 15 is positioned upon the dividing board 12 adjacent its rear portions, as clearly shown in Fig. 1, and is retained in position by means of the rivets 16, while a straight reinforcing strip 17 extends in a vertical plane adjacent the forward portions of the dividing board 12 and is retained in position by means of the rivets 18. By the use of these strips 15 and 17 and the bent over portion 14 and flange 13 it will be seen that the dividing board 12 will be positively retained in its correct shape when in use. The forward end of the dividing board 12 is rolled to provide the bearing sleeve 19 which is interposed between the eyes 10 of the body 1 of the casting. The bolt 20 is passed through the eyes 10 and the sleeve 19 and in this manner retains the dividing board in engagement with the casting although the dividing board will be allowed to pivot freely when necessary. The nut 21 is carried by the bolt 20 for retaining the bolt in its correct position permanently whereby the accidental displacement of the dividing board is prevented.

In order to normally retain the dividing board in a set position so as to extend inwardly at an angle from the casting so as to be thrown in the line of travel of the finger bar 7, the dividing board is provided with an aperture 22 through which the stem 23 passes. This stem 23 is carried by the bracket 11 and provided with the head 24 at its outer end so that the coiled spring 25 carried by the stem 23 may bear at one end against the head 24 and at the opposite end against the dividing board 12, thereby normally exerting an inward pressure upon the dividing board. A second coiled spring 26 is carried upon the stem 23 and bears at one end upon the bracket 11 and at the opposite end upon the dividing board, thereby exerting a slight outward pressure upon the dividing board. It is, of course, obvious that the tension of the springs is such that the dividing board will normally extend in the position shown clearly in Fig. 3. Therefore, as the grain which is cut adjacent the outer end of the finger bar falls rearwardly it will be caught by the dividing board and thrown over on to the mowed portions of the field. If, however, strain is brought to bear upon the dividing board which will overcome the pressure of the coiled spring 25 the dividing board will be swung outwardly for a distance so as to reduce or relieve the strain, and as soon as the strain is removed the tension of the spring 25 will again swing the dividing board to its normal position. It is further obvious that when the mower is being turned considerable strain is brought to bear upon the dividing board swinging the same sometimes inwardly. Therefore, in order to relieve this strain to a certain extent and prevent the dividing board from becoming injured by the bracket 11 the spring 26 is employed and the resiliency of the spring will take up the strain, thereby leaving the dividing board uninjured.

A U-shaped guard finger 27 is provided with the eye 28 carried by the bolt 20. This guard finger extends forwardly over the casting and then extends rearwardly so that the free end portion thereof will extend toward the inner portions of the dividing board. Therefore, the grain or small bushes, or like vegetation which is cut by the finger bar adjacent its outer end will be directed inwardly toward the mowed portions of the field by this guard finger. Otherwise this falling grain might fall upon the dividing and connecting portions of the casting as well as the dividing board and, therefore, would cause the springs and pivoted elements to become entangled and prevent the free and efficient swinging of the dividing board when necessary.

The guard arm 29 is compressed to provide the annular groove 30 adjacent one end, while the opposite end extends to form the annular extension 31. The supporting block 32 is provided with a cut-out portion 33 in which the lower end of the guard arm 29 is adapted to fit, as clearly shown in Figs. 2 and 7. This block is retained upon the dividing board 12 by means of rivets 34. In alinement with the block 32 there is carried a clamp 35, being retained in position by means of the rivets 36 upon the dividing board 12. This clamp 35 is provided with an opening 37 in alinement with the groove 30 formed in the guard arm 29, when the guard arm is in position. Therefore, the set screw 38 will pass through the opening 37 and into the groove 30 so as to prevent the withdrawal of the guard arm. Of course, this set screw may be set tight enough to retain the guard arm in its correct position, although when so desired the operator of the mower may operate the extension 31 and twist the guard arm to a desired position, so that the very tall grain or shrubbery which has just been cut and which falls toward the upper portions of the dividing board will be caught by this guard arm and positively thrown back upon the portion of the field which has just been mowed.

From the foregoing description it will be seen that an efficient dividing board has been provided for mowing machines, which is formed of sheet metal to prevent its breaking when in use and which is pivotally mounted upon a certain casting so as to have free swinging movement in a horizontal plane, while the casting is supported so as to have free swinging movement in a vertical plane, so that when undue pressure is brought to bear upon the dividing board in any direction the pressure will be greatly reduced so as to prevent injury to the dividing board. Furthermore, the guard finger and guard arm are constructed so as to prevent the falling grain from falling over into the standing grain or becoming entangled in the connecting portions of the dividing board, while the spring member is employed for normally retaining the dividing board in its correct set position for efficient operation.

What is claimed is:

1. In a dividing board of the class described, the combination of a body, said body being formed of sheet metal and provided with a longitudinally extending horizontal flange at its lower portion, said body being provided with a bent over portion at its upper portion, reinforcing strips carried upon said body, whereby said reinforcing strips, said bent over portion and said flange will efficiently reinforce said body for preventing the dividing board from becoming bent or losing its correct shape when in use.

2. In a device of the class described, the combination of a finger bar, a casting pivotally mounted in a vertical plane upon the head of said finger bar, a dividing board pivotally secured to said casting, means for supporting said dividing board upon said casting, means for normally retaining said dividing board in a set position, and a U-shaped guard finger provided with an eye secured to said bolt, said guard finger extending above the upper portions of said casting, and having its free end extending inwardly toward the inner portions of said dividing board whereby the pivoted portions of said dividing board when the same is secured to said casting will be protected from falling grain since this guard finger will direct falling grain inwardly upon the portion of a field which has just been mowed and prevent the same from becoming entangled in the pivoted portions of said dividing board.

3. In a device of the class described, the combination of a dividing board, means for securing said dividing board to the finger bar of a mowing machine, a supporting block fixedly mounted upon said dividing board and provided with a recess, a clamp fixedly mounted upon said dividing board in proximity to said supporting block, a guard arm passing through said clamp and extending into the recess of said supporting block, said guard arm provided with an annular groove, a set screw passing through said clamp and into said annular groove whereby said guard arm will be held against displacement and retained in an adjusted set position.

4. In a device of the class described, the combination of a casting, means for pivotally mounting said casting in a vertical plane upon a finger bar head, means for limiting the pivotal movement of said casting in one direction, eyes formed upon the rear end of said casting in spaced relation with respect to each other, a dividing board having a sleeve formed upon its forward end, said sleeve fitting between said eyes, a bolt passing through said eyes and sleeve for pivotally supporting said dividing board, an L-shaped bracket formed upon said casting intermediate said eyes, said bracket being spaced from the inner surface of said dividing board, said board having an opening opposite said bracket, a stem carried by said bracket and extending through said opening, two coil springs carried by said stem one bearing upon each side of said dividing board for yieldably retaining said board in a set position.

5. In a device of the class described, the combination of a finger bar, a casting pivotally mounted in a vertical plane upon said finger bar, a dividing board secured to said casting, a bolt carried by said casting and engaging said dividing board for pivotally supporting said dividing board, means for yieldably retaining said dividing board in one position, and means carried by said bolt and being spaced from the connecting portion of said casting and dividing board so as to protect the same from falling grain.

In testimony whereof I hereunto affix my signature.

ADOLPHUS A. DORSEY.

Copies of this patent may be obtained for five cents each, by addressing the "Commissioner of Patents, Washington, D. C."